United States Patent Office 2,892,309
Patented June 30, 1959

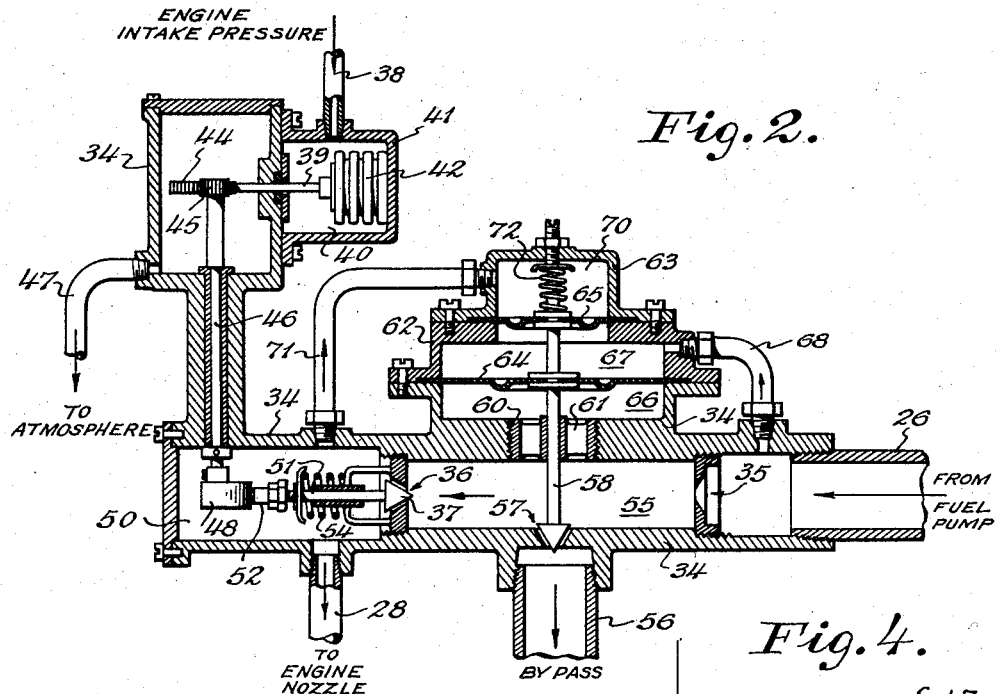
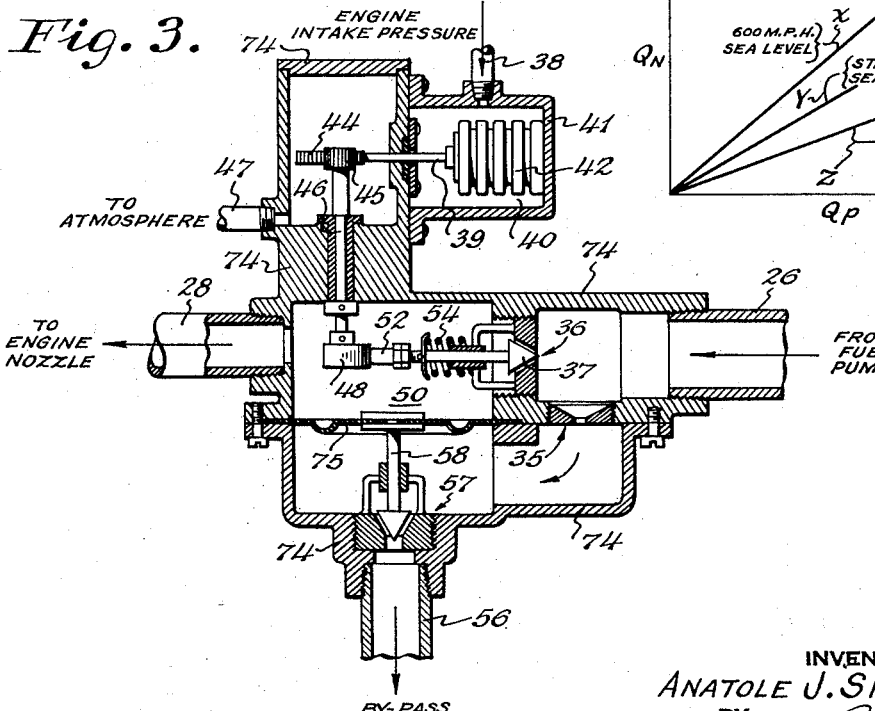

2,892,309

FUEL METERING SYSTEM FOR STARTING GAS TURBINE ENGINES

Anatole J. Sipin, New York, N.Y., assignor to Sperry Rand Corporation, a corporation of Delaware Application December 21, 1953, Serial No. 399,190

8 Claims. (Cl. 60—39.14)

This invention relates to a system for starting gas-turbine engines of the turboprop or turbojet types by regulation or metering of the fluid fuel supply thereto. Engines of this character as particularly adapted for use in aircraft have been started by injecting arbitrary amounts of the fluid fuel into the combustion chamber. This method of engine starting has proven satisfactory under conditions where the craft is grounded. However, when the craft is in flight and/or under a high altitude condition, this method can result in excessive temperatures or rich "blow out" of the engine, and starting is often difficult.

In accordance with the present invention, satisfactory starting results are attained under all conditions of engine operation by regulation of the quantity of fluid fuel injected into the combustion chamber in accordance with the air intake pressure of the engine. This pressure is dependent on the air speed and altitude of the aircraft. In the improved system, the starting fuel flow is proportional to the output of the fuel pump and therefore also to the speed of the engine, the fuel pump being directly driven from the turbine. In accordance with the present invention, the fluid fuel pressure drops across a throttling device of fixed orifice area and across a second throttling device of variable orifice area are compared to regulate the proportion of the fluid fuel flow from the fuel pump that is to be supplied to the nozzle elements of the engine, the proportion depending on the position of the movable element of the second throttling device as determined by the air intake pressure to the engine.

The primary object of the present invention is to provide a control system for engines of the turboprop or turbojet types in which the amount of the fluid fuel supplied the combustion chamber during starting conditions is predetermined in accordance with the speed and air intake pressure of the engine. The air intake pressure is determined by the air speed and altitude of the craft.

One of the features of the invention resides in the provision of a means for regulating the flow of fluid fuel from the fuel pump of the engine to the nozzle element thereof that includes a fixed orifice area throttling device, a variable orifice area throttling device, a fluid fuel by-pass valve controlled by the pressure drops across the respective throttling devices, and a means responsive to the air intake pressure of the engine operatively connected to the movable element of the variable orifice area throttling device.

Other objects, features and structural details of the invention are hereafter set forth in the following description in connection with the accompanying drawings, in which:

Fig. 2 is a lengthwise vertical section of the starting control element shown in Fig. 1;

Fig. 3 is a lengthwise vertical section of a modified form of starting control element embodying the present inventive concepts, and Fig. 4 is a graph having straight line representations thereon showing the proportionality between the fluid fuel flow to the nozzle element of the engine and from the fuel pump of the engine under different craft flight conditions.

Figure 1:
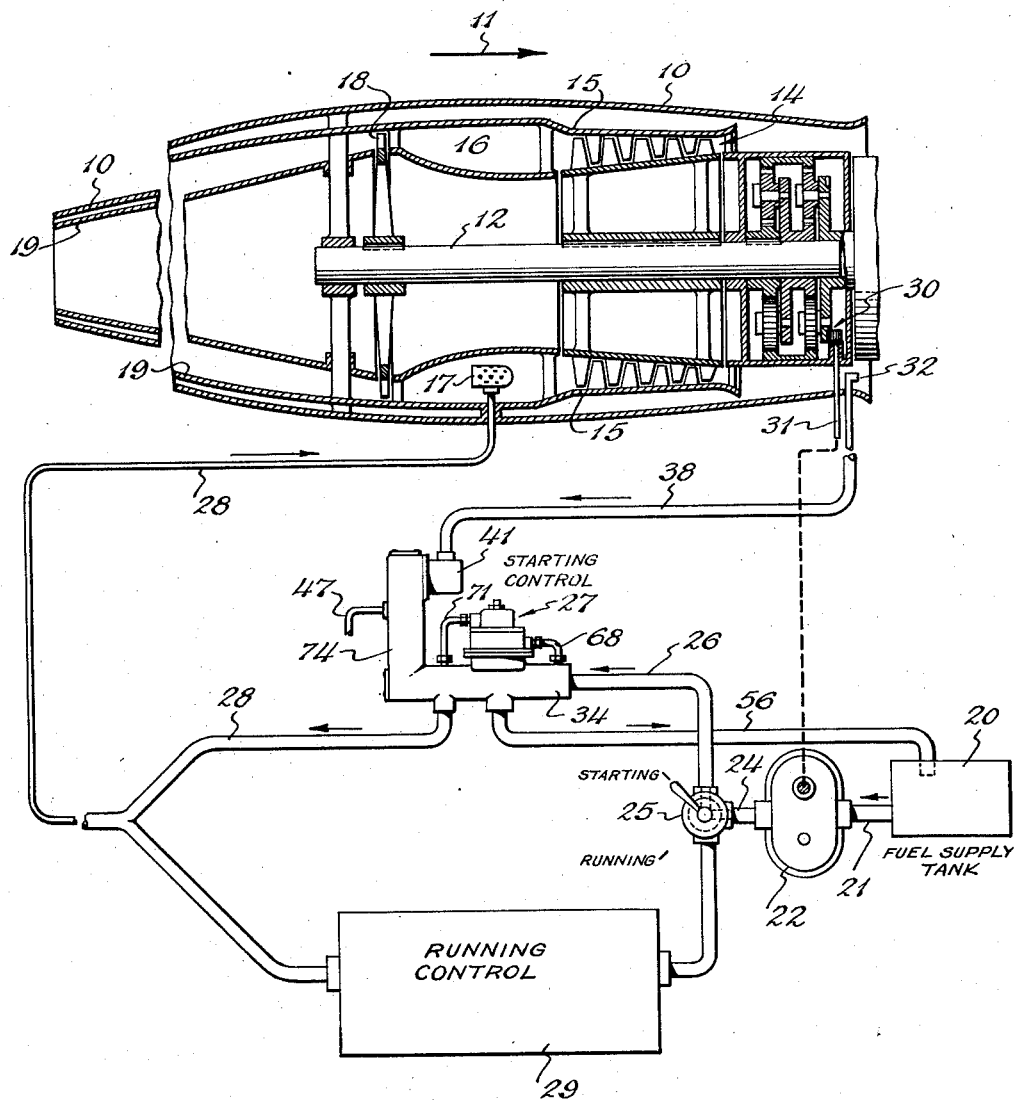
Fig. 1 is a diagrammatic view showing the connected relation of the elements of the improved starting system in which a portion of an engine is shown in lengthwise vertical section.

With reference to Fig. 1 of the drawings, the gas-turbine engine shown therein includes a suitable housing structure or nacelle 10 that is fixedly mounted on the craft for movement along its lengthwise dimension in the direction indicated by the arrow 11. The axial flow type engine shown further includes an axially located shaft 12 that is supported by suitable spaced bearings in the housing structure. The rotor blades of the air compressor 14 of the engine are fixedly mounted on the forward end of the shaft 12. The coperating stator blades of the air compressor 14 are carried by a cowling 15 or second housing part within the nacelle 10. Air enters the compressor 14 from the forward open end of the nacelle 10 and cowling 15 and is delivered under pressure by the compressor 14 to the combustion chamber of the engine indicated at 16. When the engine is started, shaft 12 starts to rotate with corresponding rotation of the rotor of the air compressor 14 which functions to pump air into the combustion chamber 16. Suitable fluid fuel is simultaneously supplied to the combustion chamber 16 along with the air needed for combustion, the fuel entering the chamber from one or more nozzle elements that are fixedly mounted therein. One of such nozzle elements is shown in Fig. 1 of the drawing being designated by the reference character 17. As shown, the gaseous products of combustion of the fuel and air drive a turbine whose rotor blades 18 are carried on the rearward end of the shaft 12. The gases issuing from the turbine pass through a tailpipe 19 and exhaust to the atmosphere.

As shown in Fig. 1, fuel is supplied to the nozzle element 17 from a suitable fuel supply tank 20, by way of conduit or pipe 21, a constant capacity fluid fuel pump 22 that is driven by the engine, conduit or pipe 24, a changeover valve 25, pipe 26 or conduit to the starting control unit 27 of the system, and pipe 28 or conduit connected to the nozzle 17. The present subject matter concerns the starting of the engine only, so that valve 25 is shown set in the starting position and the output of the pump 22 is directly supplied to control unit 27 by way of pipes 26 and 24. After the completion of the starting operation, the changeover valve 25 is moved to the running position so that the starting control unit is entirely by-passed. The pump 22 then supplies the fuel to the nozzle 17 by way of a running control designated at 29, the subject matter of which forms no part of the present invention.

The fuel pump 22 of the system is driven at a speed that is proportional to the speed of shaft 12 of the engine by way of suitable reduction gearing indicated at 30 and connected shafting 31. In accordance with the invention, means are provided to measure the air intake pressure of the engine or the air intake pressure of the air compressor of the engine in the event that the combustion and compressor units thereof are separate from one another. As shown, such means takes the form of a Pitot tube 32 located in the forward end of the nacelle 10, the tube being open to the atmosphere in the direction of the movement of the craft. The tube is furthermore positioned directly in the path of the air entering the inlet end of the air compressor 14. The air intake pressure of the engine sensed by the tube 32 is dependent on the altitude and speed of the craft.

The starting control unit 27 provides a hydraulic means for regulating the flow of fluid fuel from the pump 22 to the nozzle element 17 of the system. With reference to the form of the invention shown in Fig. 2, such regulating means includes a housing part 34 having therein a throttling device 35 of fixed orifice area. Conduit or pipe 26 from the fuel pump 22 is connected to the housing part 34 adjacent the throttling device 35. Pipe 26 provides a conduit for the fluid fuel between the fixed area throttling device and the fuel pump of the system. The system further includes a second throttling device 36 of variable orifice area having a movable element or valve part 37 whose position determines the orifice area of the device. The orifice area of the second throttling device is made proportional to the air intake pressure of the engine in accordance with the subject invention. The operative connection between the air intake pressure measuring means of the system and the movable element 37 of the throttling device 36 includes a conduit or pipe 38 from the Pitot tube 32 to a pressure chamber 40 defined by a closed end cylindrical housing 41 suitably secured to the housing part 34. An evacuated bellows unit 42 operates to sense the pressure within the chamber 40. One end of the pressure responsive bellows 42 is connected to the inside end wall of the housing part 41. A suitable slide rod 39 extends from the other end of the bellows 42 through an air tight packing gland in the inside wall of the housing part 34 to position a suitable rack element 44 located on the end of the rod 39. Rack 44, as shown, meshes with a gear 45 located at one end of a shaft 46 rotatably supported within the housing unit 34. The rack 44 and gear 45 elements of the operative connection are located in a separate compartment defined by the housing unit 34 that is open to atmospheric pressure by way of pipe 47. The bearing supporting the shaft 46 in the housing 34 includes a suitable air-tight packing structure. The opposite end of shaft 46 includes a cam 48 that is located in a chamber 50 defined by the housing unit 34 at the downstream end of the throttling device 36. The conduit or pipe 28 of the system supplying fluid fuel under pressure to the nozzle element 17 is situated between the downstream end of throttling device 36 and the nozzle 17. Pipe 28 is connected to the portion of the housing part 34 containing the pressure chamber 50. The valve stem 51 of the movable element 37 is slidably mounted within the chamber 50 and includes at the end thereof a follower part 52 for the cam 48. Spring 54 biases the stem 51 to the most open position of the valve element 37 permitted by the engaged cam and cam follower parts. The described elements operate so that as the air pressure at the intake of the engines increases the orifice area of the throttling device 36 increases to permit a greater quantity of fluid fuel to flow to the engine nozzle 17. With a decrease in engine air pressure, the orifice area of device 36 decreases to decrease the quantity of fluid fuel going to the nozzle by way of pipe 28. When the engine is started, the valve element 37 of the throttling device 36 is positioned according to the engine air intake pressure and the quantity of fluid fuel permitted to flow to the nozzle element 17 is correspondingly metered.

In the form of the invention shown in Fig. 2, the housing part 34 includes a further chamber 55 which provides a conduit or pipe between the fixed area throttling device 35 and the variable area throttling device 36, the second of the devices being situated, in this instance, in downstream relation to the first device. In accordance with the present inventive concepts, the fluid fuel supplied by the pump 22 not available for use at the nozzle 17 is returned to the fuel supply tank 20 by a by-pass means, conduit or pipe that connects the downstream end of the fixed orifice area throttling device 35 and the input to the fuel pump, the flow of the fluid fuel return being regulated in accordance with the pressure drops across the respective throttling devices of the system. As shown in Fig. 2, the means for by-passing the supply of fluid fuel to the nozzle element 17 includes a conduit or pipe 56 connected to chamber 55 portion of the housing part 34. Pipe 56 returns the fluid to the fuel supply tank 20 or to the input end of the fuel pump 22. The by-pass further includes a valve means 57 with a movable element or stem part 58 that in connection with its related seat in the housing unit 34 regulates the passage of fuel from the chamber 55 to the pipe 56. The valve means is situated in the conduit connection between the downstream end of the fixed area orifice throttling device 35 and the input to the fuel pump. As shown in Fig. 2, the stem 58 is slidably mounted in the housing part 34 by a threaded element 60 having axial vents 61 therein. The movable element of the by-pass means is operatively connected to a pressure responsive means in the form of a diaphragm stack formed as a part of the housing 34. The stack includes chamber defining and diaphragm retaining parts 62 and 63 suitably secured to the housing part 34. The stack further includes two diaphragms 64 and 65, one of whose effective areas is twice the effective area of the other. Both diaphragms are connected to the stem 58 of the movable element of valve means 57. The pressure chamber 66 on the negative or valve opening side of the larger of the diaphragms 64 is connected to the pressure chamber 55 of the system by way of the vents 61 in the element 60. The vents 61 provide a conduit connecting the downstream end of the fixed orifice area throttling device and the chamber 66. Part 62 defines a pressure chamber 67 on the positive or valve closing side of the larger of the diaphragms 64 that is connected by a conduit or pipe 68 to the upstream end of the fixed area orifice throttling device 35. Chamber 67 is located in the intermediate area between the two diaphragms 64 and 65 so that the pressure therein exerts a negative influence on the smaller of the diaphragms 65. A conduit or pipe 71 between chambers 50 and 70 provides pressure on the positively acting side of the smaller diaphragm 65 in accordance with the pressure at the downstream end of the variable area orifice throttling device 36. The system operates to vary the proportionality of the fluid fuel flow in the conduit or pipe 28 to the engine nozzle 17 in relation to the flow from pump 22 in the intake conduit or pipe 26 as a function of the air intake pressure of the engine. A spring 72 may be provided in the diaphragm stack to ensure that the by-pass valve is closed when there is no flow of fluid fuel in the system. The magnitude of the pressure drops across the respective orifices of the system should preferably not exceed 50 pounds per square inch at maximum flow to maintain the required accuracy of the system. The theory of operation of the system shown in Fig. 2 is mathematically demonstrated in the following equations; wherein $P_p$ is the pressure in pipe 26; $P_o$ is the pressure in chamber 55; $P_n$ is the pressure in pipe 28; $P_r$ is the engine intake air pressure; $Q_p$ is the fuel flow from the pump; $Q_n$ is the fuel flow to the nozzle 17; $Q_{b.p.}$ is the fuel flow to the by-pass conduit; $A_f$ is the fixed orifice area of throttling device 35; $A_v$ is the variable orifice area of the throttling device 36; $A_1$ is the area of diaphragm 65; $A_2$ is the area of diaphragm 64; $C_{d.f.}$ is the fixed orifice coefficient; and $C_{d.v.}$ is the variable orifice coefficient.

For a condition of equilibrium of the diaphragm stack (1) $\qquad P_n A_1 + P_p A_2 - P_p A_1 - P_o A_2 = 0$ With $A_2 = 2A_1$, the Equation 1 in terms of $A_1$ only becomes (2) $\qquad P_n A_1 + 2 P_p A_1 - P_p A_1 - 2 P_o A_1 = 0$ or $\qquad P_n A_1 + P_p A_1 - 2 P_o A_1 = 0$ or $\qquad (P_p - P_o) A_1 - (P_o - P_n) A_1 = 0$ or $\qquad P_p - P_o = P_o - P_n$ The fuel flow to the nozzle in pipe 28 is (3) $\qquad Q_n = C_{d.v.} A_v \sqrt{2 \dfrac{g}{w}(P_o - P_n)}$ The fuel flow from the pump is (4) $$Q_p = C_{d.f.} A_f \sqrt{2\frac{g}{w}(P_p - P_o)}$$

In Equations 3 and 4; $g$, is the acceleration of gravity, and $w$, is the specific weight in pounds per cubic foot of the fluid fuel.

Dividing (3) by (4) with $$P_p - P_o = P_o - P_n$$

(5) $$\frac{Q_n}{Q_p} = \frac{C_{d.v.} A_v}{C_{d.f.} A_f}$$

With $C_{d.v.}$ and $C_{d.f.}$ kept constant or made proportional, where $$K = \frac{C_{d.v.}}{C_{d.f.} A_f}$$

with $A_v$ proportional to $$\frac{P_r}{14.7}$$

as represented by $\delta$; then (6) $$Q_n = (K)\delta Q_p$$

Fig. 4 is indicative of the proportionality relation between the nozzle fuel flow and pump fuel flow for different conditions of engine air intake pressure. Line X shows a condition for starting the engine when the craft is at sea level or substantially zero altitude and traveling or flying at a speed of 600 miles per hour with the factor $\delta$ at a value of 1.7. Line Y depicts a craft starting condition where the craft is at sea level and stationary or static. The factor $\delta$, in this instance, is 1.00. A still different starting condition is depicted by line Z where the craft is at a 50,000 foot altitude and traveling or flying at a speed of 200 miles per hour. The factor $\delta$ in this instance is .14.

In the modification of the invention shown in Fig. 3, the housing part 74 of the control unit 27 is altered to eliminate the intermediate pressure chamber 55 between the respective throttling devices. In this construction, the throttling devices are situated together and both of the same are subject to the output pressure $P_p$ of the fuel pump. The housing part 74 also accommodates a single diaphragm element 75 that is connected to the by-pass control valve 57. In this instance, the pressure at the downstream end of the fixed area throttling device 35 acts on the negative side of the diaphragm to open the by-pass valve 57. The pressure at the downstream end of the variable area throttling device acts on the positive side of diaphragm 75 to close the by-pass valve 57. Pipe 28, in the modified structure, connects with the downstream chamber 50 at the side of the housing part 74 instead of at the bottom thereof. This pipe provides the conduit by which the fuel is supplied to the engine nozzle 17 from the control unit 27. The movable element of the by-pass control valve is responsive to the respective pressures at the downstream ends of the two throttling devices, the fuel flow varying in pipes 28 and 56 as a function of the air intake pressure of the engine.

With the same factors as previously set forth, the theory of operation of the system shown in Fig. 3 is mathematically demonstrated in the following manner.

The fuel flow to the nozzle in pipe 28 is (7) $$Q_n = C_{d.v.} A_v 2\frac{g}{w}(P_p - P_n)$$

The fuel flow to the by-pass conduit is (8) $$Q_{b.p.} = C_{d.f.} A_f 2\frac{g}{w}(P_p - P_o)$$

For a condition of equilibrium of the diaphragm 75

$$P_o = P_n$$

Substituting and dividing Equations 7 and 8

(9) $$\frac{Q_n}{Q_{b.p.}} = \frac{C_{d.v.} A_v}{C_{d.f.} A_f}$$

With $C_{d.v.}$ and $C_{d.f.}$ kept constant or made proportional, where $$K = \frac{C_{d.v.}}{C_{d.f.} A_f}$$

with $A_v$ proportional to $$\frac{P_r}{14.7}$$

as represented by $\delta$; then

(10) $$Q_n = K\delta Q_{b.p.}$$
(11) $$Q_{b.p.} = Q_p - Q_n$$

Substituting 11 for $Q_{b.p.}$ in Equation 10, and simplifying

(12) $$Q_n = \frac{K\delta Q_p}{1 + K\delta}$$

In both Equations 6 and 12, the ratio of fuel flow to the nozzle ($Q_n$) and the fuel flow from the pump ($Q_p$) is dependent on a constant and the value $\delta$ that varies with the air intake pressure to the engine.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A hydraulic starting system for gas-turbine engines having a fuel nozzle element, and a constant capacity pump driven by the engine supplying fluid fuel under pressure to the nozzle element; hydraulic means for regulating the flow of fluid fuel from the pump to the nozzle element under starting conditions including a throttling device of fixed orifice area, a first conduit between the fixed area throttling device and the pump, a second throttling device of variable orifice area having a movable element, a second conduit between the downstream end of the first throttling device and the second throttling device, means for providing a measure of the air intake pressure of the engine, an operative connection between the air intake pressure measuring means and the movable element of said second throttling device, a third conduit between the downstream end of said second throttling device and the nozzle element, means for by-passing a portion of the fluid fuel supplied by the pump including a fourth conduit from the second conduit to the input of the fuel pump having valve means therein with a movable element, pressure responsive means operatively connected to the movable element of said by-pass means including a diaphragm stack having two diaphragms, one of whose effective areas is twice the effective area of the other, a fifth conduit connecting the second conduit and the side of the larger of the diaphragms operable to open the movable element of said by-pass valve means, a sixth conduit connecting the first conduit and the intermediate area between the two diaphragms, and a seventh conduit between the third conduit and the side of the smaller of the diaphragms operable to close the movable element of said by-pass valve means, the system operating to vary the proportionality of the fluid fuel flow in the third and first conduits as a function of the air intake pressure of the engine.

2. A hydraulic starting system for gas-turbine engines having a fuel nozzle element, and a constant capacity pump driven by the engine supplying fluid fuel under pressure to the nozzle element; hydraulic means for regulating the flow of fluid fuel from the pump to the nozzle element under starting conditions including a throttling device of fixed orifice area, a second throttling device of variable orifice area having a movable element, a first conduit between the throttling devices and the pump, means for providing a measure of the air intake pressure of the engine, an operative connection between the air intake pressure measuring means and the movable element of said second throttling device, a second conduit between the downstream end of said second throttling device and the nozzle element, means for by-passing a portion of the fluid fuel supplied by the pump including a third conduit between the downstream end of said fixed area throttling device and the input to the fuel pump having valve means therein with a movable element, and means operatively connected to the movable element of said by-pass means including diaphragm means responsive to the respective pressures at the downstream ends of the second and first throttling devices, the system operating to vary the proportionality of the fluid fuel flow in the second and first conduits as a function of the air intake pressure of the engine.

3. In a hydraulic starting control system for gas-turbine engines having a pump for supplying fluid fuel to the engine, the combination of, a fluid fuel flow throttling device of fixed orifice area receiving fluid fuel from the pump, a second fluid fuel flow throttling device of variable orifice area receiving fluid fuel from the pump having a movable element, a conduit between the downstream end of the variable orifice throttling device supplying fluid to the engine, means operatively connected to the movable element of said second throttling device so that the orifice area thereof is proportional to the air intake pressure of the engine, means for by-passing a portion of the fluid fuel supplied by the pump including valve means with a movable element, and means operatively connected to said by-pass valve movable element responsive to the respective pressures at the downstream ends of the throttling devices.

4. A starting system for gas-turbine engines having a fuel nozzle element, a constant capacity pump driven by the engine supplying fluid fuel under pressure, a throttling device of fixed orifice area receiving fluid fuel from the pump, a second throttling device of variable orifice area receiving fluid fuel from the pump having a movable element, means for providing a measure of the air intake pressure of the engine, an operative connection between the air intake pressure measuring means and the movable element of said second throttling device, a conduit between the downstream end of the second throttling device and the nozzle element, means for by-passing a portion of the fluid fuel supplied by the pump including a second conduit between the downstream end of said fixed area throttling device and the fluid fuel input to the fuel pump having valve means therein with a movable element, and means operatively connected to the movable element of said by-pass valve responsive to the pressure downstream of the respective orifices of the throttling devices, the system operating to vary the proportionality between the fuel flow to the nozzle element and from the pump as a function of the air intake pressure of the engine.

5. A system as claimed in claim 4, in which the second throttling device is situated in downstream relation to the first throttling device.

6. A system as claimed in claim 4, in which both throttling devices are subject to the output pressure of the fuel pump of the engine.

7. A hydraulic starting system for gas-turbine engines having a nozzle element, and a constant capacity pump driven by the engine supplying fluid fuel under pressure to the nozzle element; hydraulic means for regulating the flow of fluid fuel from the pump to the nozzle element under starting conditions including a throttling device of fixed orifice area receiving fluid fuel from the pump, a second throttling device of variable orifice area receiving fluid fuel from the pump having a movable element, means for providing a measure of the air intake pressure of the engine, an operative connection between the air intake pressure measuring means and the movable element of said second throttling device, a conduit between the downstream end of said second throttling device and the nozzle element, means for by-passing a portion of the fluid fuel supplied by the pump including a second conduit between the downstream end of said fixed area throttling device and the input to the fuel pump having valve means therein with a movable element, and means operatively connected to the movable element of said by-pass valve and responsive to the respective pressures at the downstream ends of the two throttling devices, the system operating to vary the proportionality between the fuel flow to the nozzle element and from the pump in accordance with the air intake pressure of the engine.

8. In a hydraulic starting control system for gas-turbine engines having a fuel nozzle element, and a pump for supplying fluid fuel to the nozzle element, the combination of a fluid fuel flow throttling device of fixed orifice area receiving fluid fuel from the pump, a second fluid fuel flow throttling device of variable orifice area receiving fluid fuel from the pump having a movable element, a conduit connecting the downstream end of the variable throttling device and the nozzle element, a by-pass conduit connecting the downstream end of the fixed throttling device and the input to the fuel pump, valve means in said by-pass conduit responsive to the pressure downstream of the respective orifices of the throttling devices, and means dependent upon the air intake pressure of the engine operatively connected to the movable element of said second throttling device.

References Cited in the file of this patent

UNITED STATES PATENTS

| | | |
|---|---|---|
| 2,508,260 | Holley | May 16, 1950 |
| 2,538,582 | Mordell et al. | Jan. 16, 1951 |
| 2,581,275 | Mock | Jan. 1, 1952 |
| 2,616,254 | Mock | Nov. 4, 1952 |
| 2,693,081 | Russ | Nov. 2, 1954 |
| 2,720,752 | Chandler et al. | Oct. 18, 1955 |
| 2,741,089 | Jagger | Apr. 10, 1956 |